United States Patent [19]
Allen, Jr. et al.

[11] Patent Number: 5,222,363
[45] Date of Patent: Jun. 29, 1993

[54] FLUIDIZED BED AIR COOLING SYSTEM

[75] Inventors: Russel G. Allen, Jr., San Antonio; A. Thomas Bradshaw, Boerne; Richard D. Patch, San Antonio; Clifford H. Collen, Boerne, all of Tex.

[73] Assignee: Carbonic Reserves, San Antonio, Tex.

[21] Appl. No.: 849,528

[22] Filed: Mar. 11, 1992

[51] Int. Cl.$^5$ ................................ F25J 1/00
[52] U.S. Cl. ........................ 62/10; 62/57; 62/384
[58] Field of Search ............ 62/10, 12, 57, 379, 62/384, 385, 386, 387, 388

[56] References Cited

U.S. PATENT DOCUMENTS

| | | | |
|---|---|---|---|
| 2,608,838 | 9/1952 | Rupp | 62/10 |
| 2,665,850 | 1/1954 | Wiczer | 62/57 |

OTHER PUBLICATIONS

Advertisement by Liquid Carbonic Corporation entitled "Cryo-Shield Liquid Carbonic Food Freezing Systems $CO_2$".
Advertisement by Tomco Systems[2] entitled "Finally, a stainless steel, modular hydraulic expandable $CO_2$ Freezer Tunnel".

Primary Examiner—Ronald C. Capossela
Attorney, Agent, or Firm—Gunn, Lee & Miller

[57] ABSTRACT

A method and apparatus for effecting the cooling of a stream of air or gas by sublimation of dry ice particles utilizes an upwardly directed, variable velocity stream of air to maintain a supply of dry ice particles provided on a moving perforated conveyor in a fluidized bed condition to maximize the rate of sublimation of the dry ice particles. The cooled air may then be employed to effect the rapid and efficient freezing of a plurality of food articles passing through the same insulated chamber as the dry ice particle conveyor is located, or an adjacent insulated chamber.

21 Claims, 5 Drawing Sheets

FLUIDIZED BED AIR COOLING SYSTEM

BACKGROUND OF THE INVENTION

1. Field of the Invention

The invention relates to a method and apparatus for effecting the cooling of a stream of gas, such as air, by passing through a fluidized bed of dry ice particles. The invention has particular utility in effecting the cryogenic treatment of food articles.

2. Summary of the Prior Art

A large variety of prior art systems have been developed to effect the cooling or freezing of food articles by circulating a cooled stream of air past the articles. In one form of such cooling apparatus, the air stream is directly downwardly through a mass of dry ice particles supported on a perforated bed and the cooled air is then directed to flow around the articles to be treated. While this system is effective, it does require an inordinate amount of time to effect the complete freezing of food articles. For example, the normal food article has to be passed not just once, but generally at least three times, slowly through the stream of cooled air in order to insure that it has been completely frozen. Larger articles would obviously require even more time.

Such prior art systems have the further disadvantage that when the size of the dry ice particles diminishes to a point where they could pass through the support screen, the dry ice particles would fall on the food articles, and if such food articles had been previously cooled and were about ready to be packaged, the dry ice particles would be adhering to the food articles when they were placed in a sealed package. Obviously, the frozen food articles are not maintained at the temperature of dry ice, so that the dry ice would sublimate within the package and quite often cause sufficient swelling of the package to effect its rupture. The cooling efficiency of the process is also reduced by virtue of the fact that the air flow through the mass of dry ice particles is impeded due to the downward packing of the dry ice particles as they decrease in size by sublimation.

SUMMARY OF THE INVENTION

This invention provides a method and apparatus for utilizing dry ice particles to cool a moving stream of gas, such as air, to more efficiently effect cooling of such stream. The cooled stream of air and gas may then be applied to articles to be cooled or frozen and with the result that the cryogenic treatment of the articles is accomplished in significantly less time and with less consumption of dry ice.

In accordance with this invention, dry ice particles, by which is meant particles of frozen carbon dioxide, preferably in the form of uniformly sized pellets, are produced in conventional fashion by a pelletizing operation performed on dry ice snow. Such pellets are supplied to an upwardly facing perforated surface having perforations substantially smaller than the initial size of the dry ice pellets. An upwardly directed air stream through the mass of dry ice pellets or particles is then produced at a velocity sufficient to maintain the dry ice particles on the perforated upwardly facing surface in a fluidized bed condition. As is well known to those skilled in the art, in the fluidized bed condition, the particles are essentially supported by the upward movement of the air passing therethrough and are in continuous motion. As a result, substantially all of the surface areas of the dry ice particles are simultaneously contacted by the gas or air to be cooled and the efficiency of the cooling of the gas or air stream is significantly increased. No packing of the dry ice particles occurs to reduce the air flow velocity.

In accordance with a preferred embodiment of the invention, the dry ice pellets or particles are deposited at a selected height on the input end of a generally horizontally moving conveyor belt containing a multiplicity of perforations. The size of such perforations are substantially smaller than the initial size of the dry ice particles, but the particles are not so small as to significantly impede the upward flow of air produced by a plurality of fans positioned along the length of the perforated conveyor belt. Such fans function to push or pull a gas or air stream upwardly through the entire mass of dry ice particles. The air stream velocity produced by the fans is controlled so that the entire mass of dry ice particles from the input region of the conveyor belt to the discharge region is maintained in a fluidized bed condition. Thus, as the particles grow smaller through sublimation, there is little tendency for the particles to fall through the conveyor flight, or be carried away by the air stream, and thus be deposited on articles to be treated which may be positioned below or adjacent the dry ice conveyor. Furthermore, the rate of supply hence the initial height of dry ice particles and/or the conveyor speed is controlled so that substantially all of the particles are sublimated prior to reaching the discharge region of the perforated conveyor.

An air or gas stream cooling apparatus embodying this invention may be employed in existing cryogenic treatment apparatus. There are two common types of such apparatus, both of which employ insulated wall chambers. In one type, horizontally extending belt conveyors within the chamber pass the articles sequentially from an input hatch to an upper flight from which they are transferred to a second flight going in the reverse direction, and then transferred to a third flight underneath the second flight and moving in the same direction as the first flight toward a discharge hatch. In this system, the dry ice conveyor embodying this invention utilizes a perforated conveyor belt that is preferably positioned above the three food article conveyors and employs a plurality of fans for directing an air stream upwardly through the mass of dry ice particles. The fans are positioned along the length of such conveyor and may be positioned below or above the conveyor so long as they generate a stream of air passing upwardly through the mass of dry ice particles with the proper velocity to maintain the entire mass of dry ice particles in a fluidized bed condition. The cooled air is then circulated within the insulated wall chamber to pass around the articles to be frozen.

In another common form of freezing apparatus, the articles to be frozen are deposited on a spiral conveyor through an inlet hatch and move in a spiral path from an inlet opening in the insulated chamber to a discharge opening. The perforated conveyor and fans producing a bed of fluidized dry ice particles in accordance with this invention, is positioned at any convenient location within the insulated chamber and the cooled air stream, after passing through the fluidized bed, is directed into contact with the articles positioned on the spiral conveyor.

It is therefore apparent that the method and apparatus of this invention for effecting the cooling of a gas or air stream by a fluidized bed of ice particles can be readily applied to any existing apparatus for effecting the cooling or freezing of food articles by exposure to a properly chilled air stream.

Further advantages of the invention will be readily apparent to those skilled in the art from the following detailed description, taken in conjunction with the annexed sheets of drawings, on which is shown several preferred embodiments of the invention.

DESCRIPTION OF PREFERRED EMBODIMENT

Figure 1:
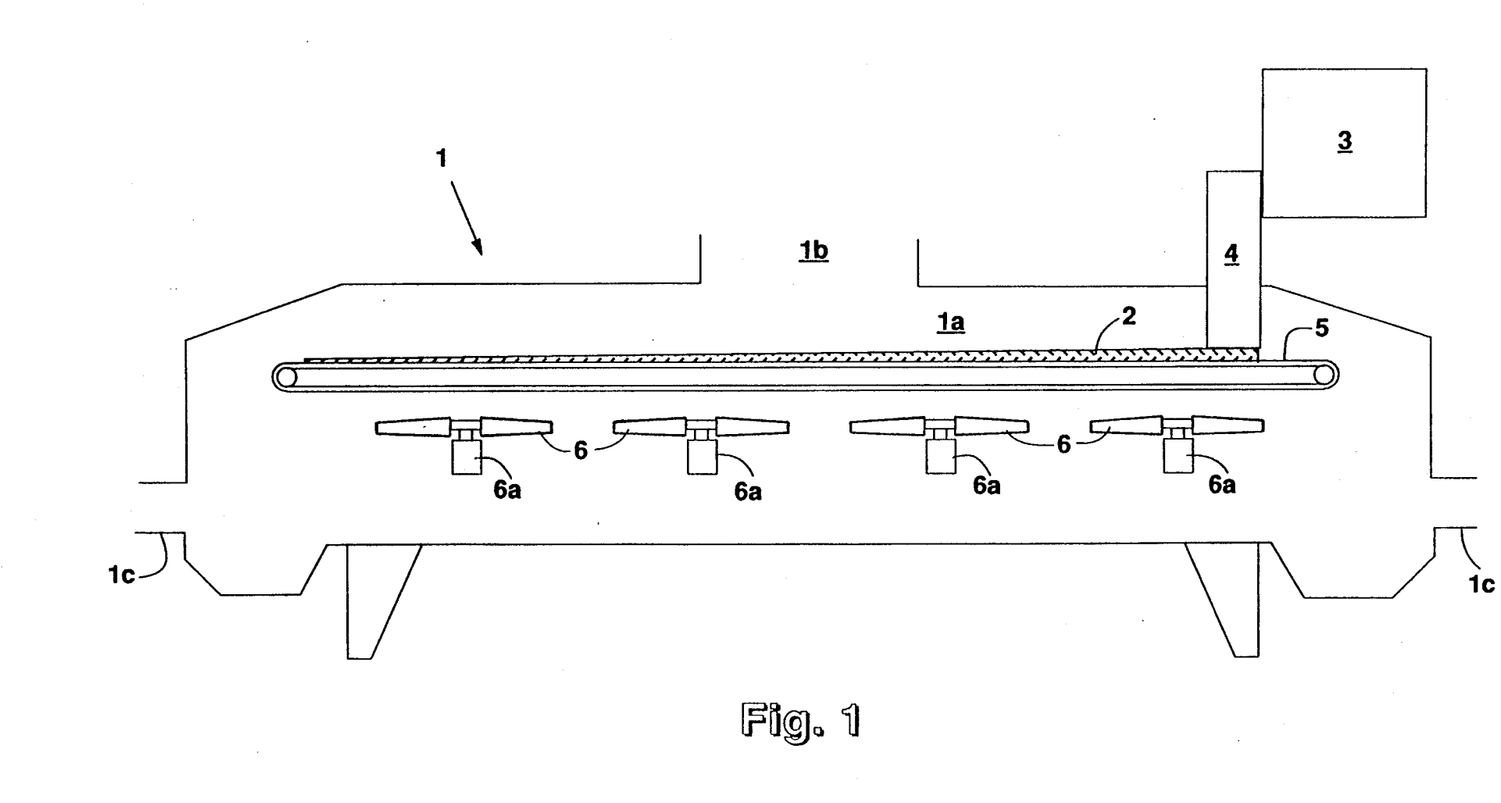
FIG. 1 is a schematic vertical sectional view illustrating the method of the invention for cooling a stream of gas, such as air.

The method embodying this invention is schematically illustrated in FIG. 1. An elongated insulated wall compartment 1 is provided defining a chamber 1a which is normally filled with atmospheric air but may, if desired, be continuously supplied with an inert gas such as nitrogen or carbon dioxide, if reduction of the amount of oxygen within the chamber 1a is desired.

At one end of chamber 1a, a hopper 3 is mounted and supplies ice particles 2, preferably in the form of uniform size pellets such as those manufactured and sold by the assignee of this application, to a dispensing apparatus 4. The lower end of dispensing apparatus 4 is disposed transversely across a horizontally extending upper flight of a perforated conveyor 5, at a preselected height above conveyor 5, thus controlling the height of the deposited dry ice particles 2 on the conveyor 5. The perforated conveyor 5 may comprise a conventional link belt conveyor having the openings between the various links large enough to permit a free upward flow of gas through the conveyor, yet small enough to retain the dry ice particles 2 on the upper conveyor flight.

If the cooled stream of gas resulting from the operation of the apparatus is to be used outside of the insulated chamber 1, then a discharge opening 1b is provided in the top wall of the insulated compartment 1, and inlet openings 1c are formed in the side or bottom walls of compartment 1.

A plurality of gas moving fans 6 are mounted along the length of the conveyor 5 and configured to produce an upwardly directed stream of air or gas through the layer of dry ice particles 2 carried by the upper flight conveyor 5. A suitable speed control is supplied for the motor 6a of each fan 6 so that the volume of air produced by the successive fans diminishes in the direction of movement of the dry ice particles by the upper flight conveyor 5 from right to left as viewed in FIG. 1, due to the sublimation of the dry ice particles by the upwardly moving stream of gas or air.

The conveyor 5 is driven by an electric motor (not shown) as is a dispensing apparatus 4. The speeds of these electric motors are variable and are controlled so as to produce at the inlet end of conveyor 5 a sufficient thickness of the ice particles or pellets 2 as to maintain the particles in a fluidized bed condition, which condition is continued across the length of the conveyor due to the reduction in air or gas velocity produced by the successive fans 6.

As is well known in the art, in a fluidized bed condition, the dry ice particles or pellets are at least partially suspended and vibrated by the upwardly moving stream of gas and results in substantially all of the surfaces of the particles being contacted by the upwardly moving stream of gas, thus providing maximum cooling effect on the stream of gas by sublimation of the dry ice particles. Also, heat is exchanged between the stream of gas and the dry ice 2 to provide additional cooling that may not necessarily cause sublimation. Preferably, the dry ice particles are supplied in the form of uniformly sized pellets. The conveyor speed and the speeds of the various fans may be varied to maintain the dry ice pellets 2 in a fluidized bed condition across substantially the entire length of the upper flight of conveyor 5. Ideally, all of the dry ice particles will be sublimated before reaching the discharge end of the conveyor 5. Thus, noy dry ice particles are blown upwardly off the conveyor 5 to fall on any articles disposed in the chamber 1 below the conveyor belt 5, nor dropped off of the end of conveyor 5. Thus a maximum rate of cooling of the upwardly directed gas or air stream is achieved.

Figure 2:
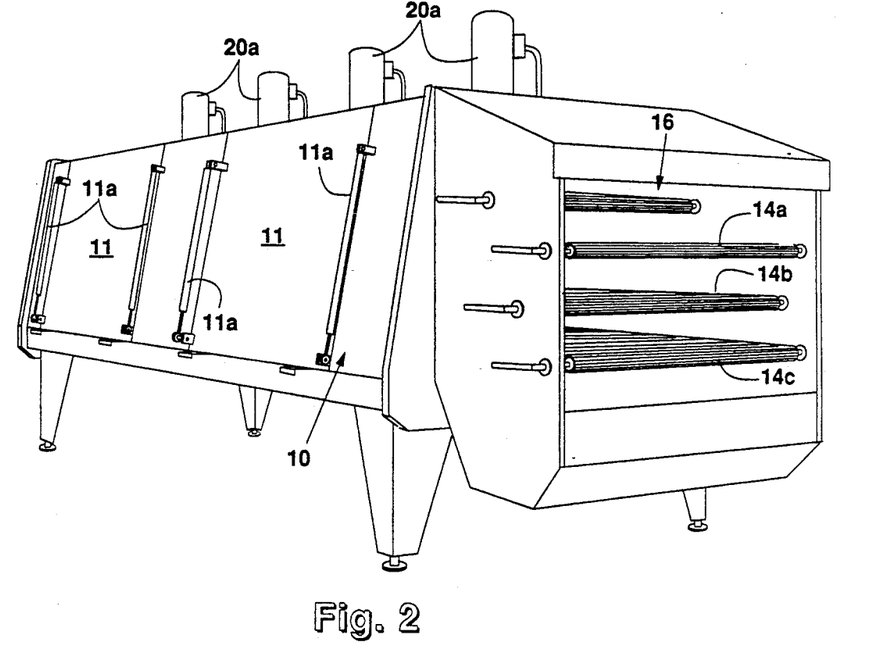
FIG. 2 is a perspective view of one form of food freezing apparatus embodying this invention, with the end panel and dry ice feeding mechanism removed.
Figure 3:
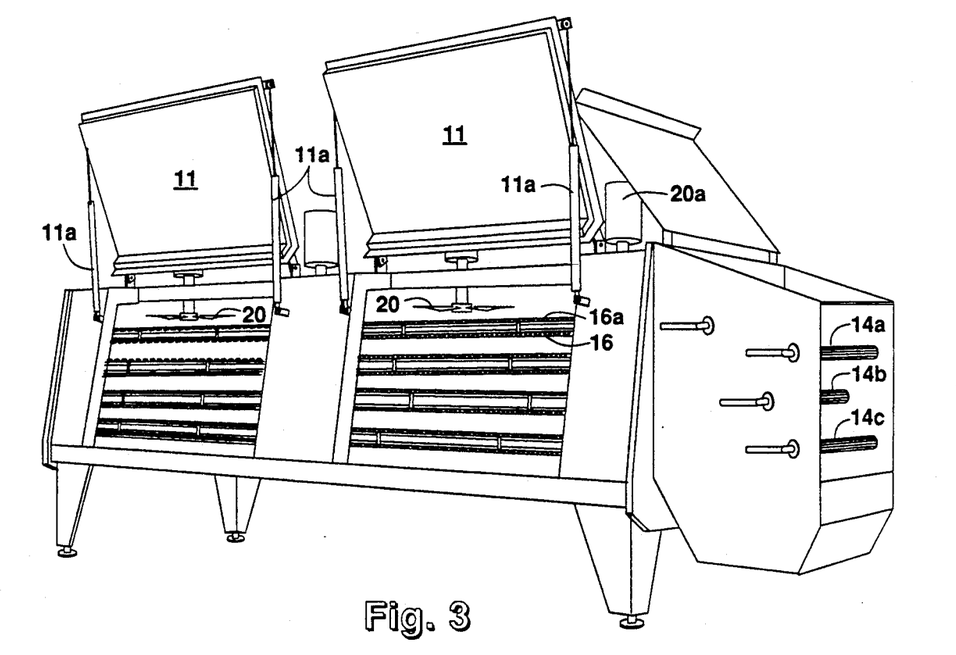
FIG. 3 is a perspective view similar to FIG. 2 but with the side panels of the apparatus open to show the interior of the apparatus.
Figure 4:
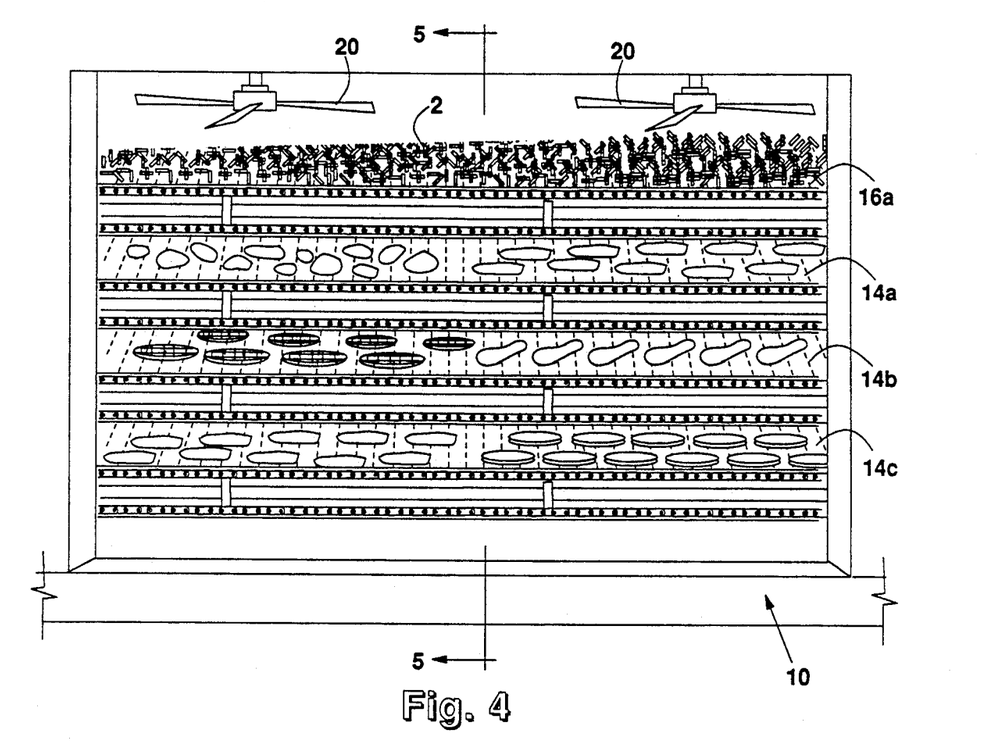
FIG. 4 is an enlarged scale, partial longitudinal, vertical sectional view of FIG. 2 illustrating the freezing of food articles by the apparatus of FIG. 2.
Figure 5:
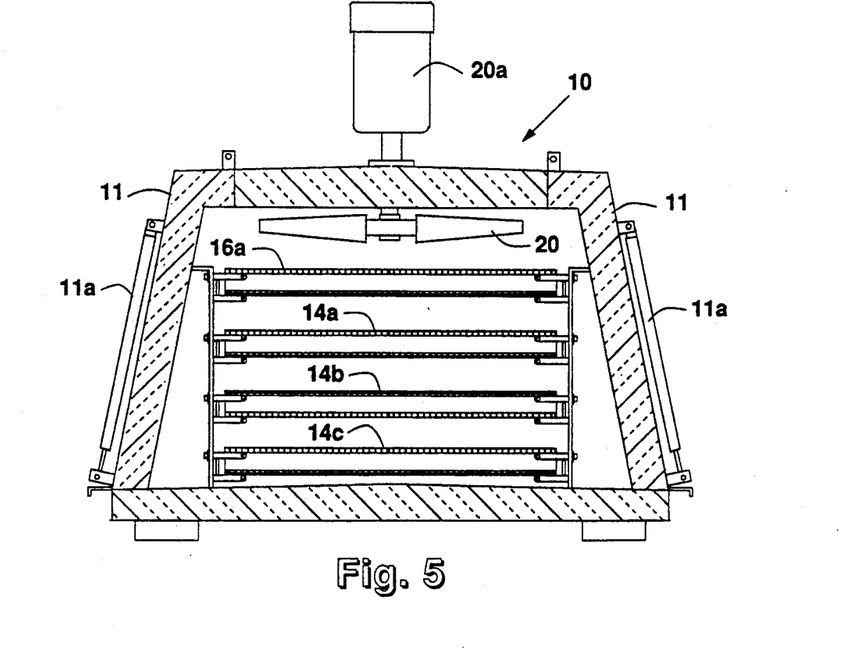
FIG. 5 is a sectional view taken on the plane 5—5 of FIG. 4.

Referring now to FIGS. 2-6, there is shown one form of apparatus for freezing food articles embodying the method of this invention. Thus, as shown in FIGS. 2 and 3, an insulated wall freezing compartment 10 is provided having pivotally mounted access panels 11 on each side thereof operated by cylinders 11a. The cylinders 11a may be spring loaded gas cylinders or any other suitable cylinder. Food particles are introduced into the left end of the compartment, as viewed in FIG. 6 by a conventional conveyor 8 which passes through a wall opening partially closed by a plurality of dangling parallel flexible strips 8a to reduce the loss of cooled air through such opening. In similar manner, a removal conveyor 7 is provided in the right hand end of the insulated compartment 10 and receives frozen food articles through a wall opening covered by a plurality of dangling parallel flexible strips 7a to minimize loss of cooled air from the insulated compartment 10.

Figure 6:
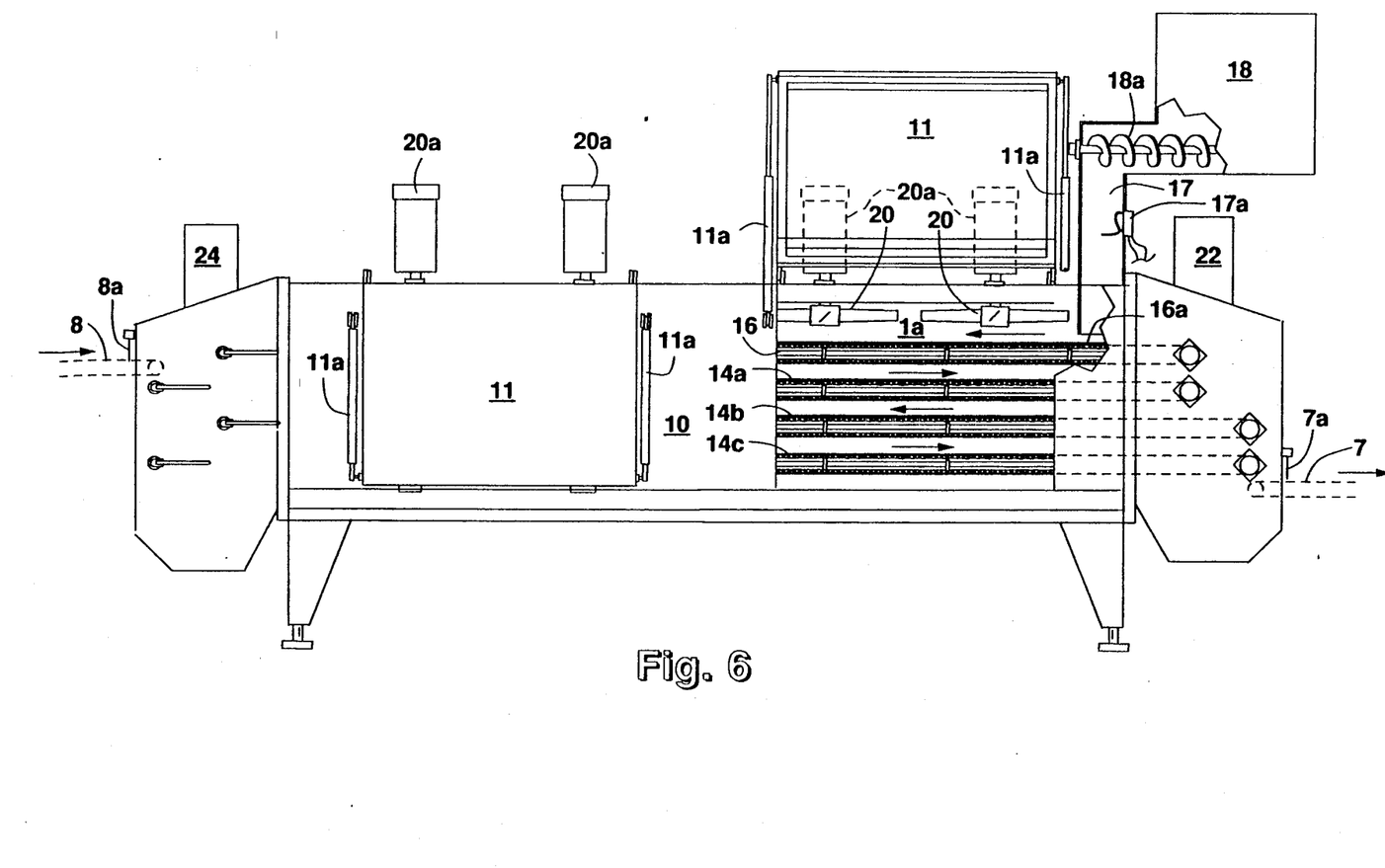
FIG. 6 is a side elevational view of the apparatus of FIG. 1 but showing a preferred apparatus for supplying dry ice particles to the freezing apparatus.

If there is a problem obtaining FDA approval of the parallel flexible strips 8a, the space of the opening for conveyor 8 can be reduced by any conventional means, including even an adjustable gate (not shown) to reduce the size of the opening depending upon the height of the items being cooled. The same is true for flexible strips 7a for removal conveyor 7. This would minimize the air loss and, hence, the heat loss.

Within the lower portion of the compartment 10, a plurality of vertically stacked flights of perforated endless belt conveyors are provided for transporting food articles through one or more successive passes through the insulated compartment 10. In the particular example shown in the drawings, three such passes are made by the food articles to be frozen, which are illustrated only in FIG. 4. The food articles are dropped onto the uppermost food conveyor 14a and moved through compartment 10 from the left end to the right hand end and then dropped on the inlet end of food conveyor 14b, and moved to the left end of compartment 10. The articles to be frozen are then dropped on the inlet end of the lowermost food conveyor 14c and moved back to the right end of compartment 10 to be discharged from conveyor 14c onto the take away conveyor 7.

The reduction of the air temperature within the insulated compartment 10 to a level sufficient to accomplish the freezing of the food articles is produced by dry ice particles or pellets carried through compartment 10 by an uppermost perforated belt conveyor 16 having an upper flight 16a moving from right to left as viewed in FIGS. 1 and 6 of the drawings.

A hopper 18 for containing a supply of dry ice particles 2 is mounted on the right hand top end of the insulated compartment 10 and includes a motor driven feeding auger 18a for delivering dry ice particles or pellets 2 into a conduit 17 which overlies the input end of the dry ice conveyor flight 16a at a selected height.

A plurality of fans 20, driven by motors 20a, are mounted above and along the dry ice conveyor flight 16a and configured to produce an upwardly directed flow of air through all of the conveyor flights 14a, 14b and 14c and particularly through the perforated conveyor flight 16a. After passing through the dry ice particles contained on the uppermost conveyor flight 16a to maintain the particles in a fluidized bed condition, the air stream is substantially cooled by sublimation of the dry ice particles and/or heat exchange with the dry ice particles. The cooled air stream circulates by gravity downwardly around the sides to the bottom of insulated compartment 10, where it is again pulled upwardly by the action of the fans 20 to cool the food articles contained on the food conveyors 14a, 14b and 14c, and to again be cooled by passing through the fluidized bed of dry ice particles contained on the upper flight 16a of the uppermost conveyor 16.

As previously mentioned in connection with the discussion of the method of this invention, the speed of the fans 20 is adjusted so as to provide a diminishing rate of upward flow of gas through the dry ice conveyor 16a from the right end of the apparatus to the left end so as to maintain the dry ice particles in a substantially fluidized bed state throughout their passage through the apparatus. The feeding of the dry ice particles is controlled by a level switch 17a mounted in the conduit 17 and this switch controls the energization of the auger 18a to provide a substantially constant level of particles on the inlet end of the particle conveyor flight 16a.

As a result of the fluidized bed condition of the dry ice particles 2, substantially no particles are blown off the particle conveyor 16a, and, since all particles are substantially sublimated before reaching the discharge end of the dry ice particle conveyor 16, no particles fall onto the food articles contained on the uppermost food conveyor 14a.

As an additional control feature, a variable speed motor 22 is provided for driving the ice particle conveyor 16 at a selected speed so as to insure the maintenance of the fluidized bed condition and the sublimation of substantially all dry ice particles before they reach the discharge end of conveyor 16. A separate variable speed motor 24 is employed for driving the food article conveyors 14a, 14b and 14c in conventional fashion. Also different motors may be used for operation of the article conveyors 14a, 14b, and 14c at different speeds.

The speed of the dry ice conveyor 16 may be adjusted inversely to the initial height of the dry ice particles on the conveyor. The greater the height, the lower the conveyor speed to insure sublimation of all particles before reaching the end of the conveyor flight 16a.

As another option, the space between the fans 20 and the dry ice 2 may be increased as the dry ice 20 moves down the conveyor 16. The increase in space may be caused due to sublimation of the dry ice 2. The increased space of the dry ice 2 from the fans 20 has been found to be sufficient in some cases to allow all fans 20 to operate at the same fixed speed and not carry over the dry ice 2 into the air stream.

Also, there may be shrouds (not shown) around the fans 20 to more accurately direct the air stream up through the fluidized bed of dry ice 2. Further air deflectors or air channels (not shown) may be used to insure the air stream circulates through the fluidized bed of dry ice 2 and over the food items being cooled.

It is therefore readily apparent to those skilled in the art that the method and apparatus of this invention provides an unusually simple, yet highly efficient method of effecting the cooling of a stream of air or gas and/or the utilization of such cooled stream of gas for effecting the rapid freezing of the food articles without incurring the risk of depositing dry ice particles on the articles to be frozen.

Figure 7:
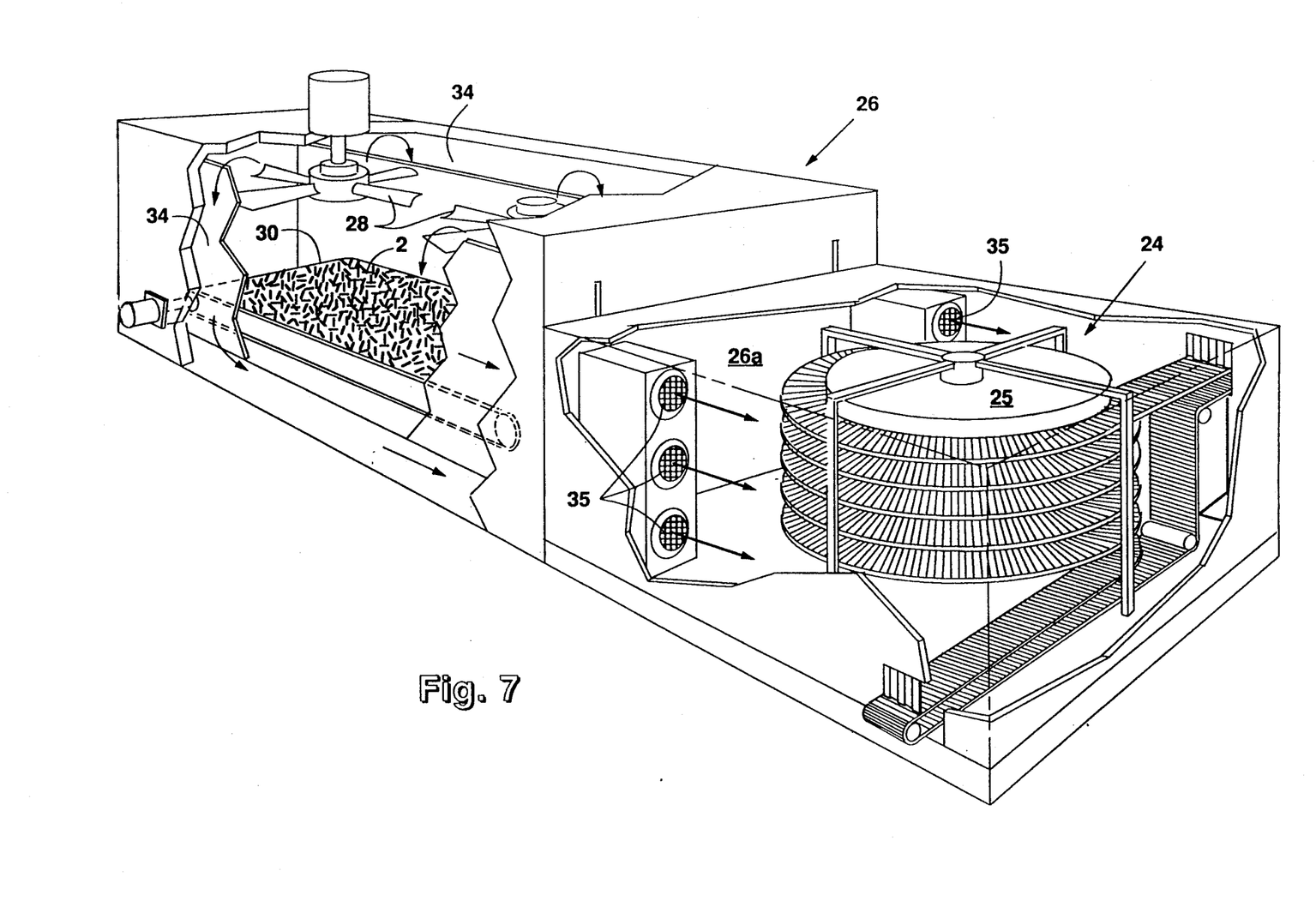
FIG. 7 is a perspective view, with parts removed for clarity, illustrating the application of the method and apparatus of this invention for use with a spiral type conveyor for freezing food articles.

FIG. 7 schematically illustrates the application of the method and apparatus of this invention to a spiral type food article conveyor of a type well known in the art and designated by the numeral 25 in FIG. 7. Spiral conveyor 25 is mounted in an insulated wall compartment 24.

The perforated, endless belt conveyor 30 for moving dry ice particles 2 is located within an insulated compartment 26 in a position adjacent to the compartment 24 containing the spiral food article conveyor 25. One or more fans 28 are employed to produce an upwardly directed stream of air through the dry ice particles 2 on the endless belt conveyor 30 to produce a fluidized bed condition and effect their sublimation in the same manner as previously described. The chilled air resulting from the sublimation of the dry ice particles is then directed by conventional channels 34 and blowers, if necessary, into the insulated compartment 24 containing the spiral food article conveyor 25. For example, the cooled air may be directed radially into the spiral layers of food article by vertically stacked nozzles 35 and then back into the compartment 26 containing the dry ice cooling apparatus through appropriate openings (not shown) in the barrier wall 26a separating the compartment 24 from the compartment 26. Most importantly, the dry ice particles 2 are maintained in a fluidized bed condition throughout their travel on the perforated belt conveyor 30, and the same conditions as previously described are maintained to insure the substantially complete sublimation of the dry ice particles before they reach the discharge end of the perforated conveyor 30.

In the alternative spiral system shown in FIG. 7, a second fan or fans (not shown) may be used to direct the cooled air stream over the items to be cooled. Other configurations of the spiral system (not shown) can locate the fluidized bed of dry ice 2 above or below the spiral conveyor 25. What is important is that the fluidized bed be located in the air stream to be cooled prior to directing the cooled air stream of the items to be cooled.

While the invention has been specifically described and illustrated in connection with an endless belt type perforated conveyor, should be readily apparent to those skilled in the art that a perforated rotary disc may be employed to receive the dry ice particles 2 at one angular position and move the particles circumferentially past fans producing an upwardly directed flow of air through the particles to maintain the dry ice particles in a fluidized bed condition until they complete the 360° revolution at which point they should all be substantially sublimated.

Other modifications of the invention will be readily apparent to those skilled in the art and it is intended that all such modifications be included within the scope of the appended claims.

What is claimed and desired to be secured by Letters Patent is:

1. The method of cooling a stream of gas comprising the steps of:
    supporting a mass of substantially uniform size dry ice particles on a perforated base;
    directing a stream of gas upwardly through said dry ice particles at a velocity selected to convert said particles into a fluidized bed; whereby substantially all of the surface areas of said dry ice particles are contemporaneously contacted and sublimated by said stream of gas;
    relatively moving said perforated base transverse to the stream of gas, said stream of gas extending substantially along the entire movement of said perforated base; and
    supplying dry ice particles to said perforated base at a location moving into said stream of gas, whereby the size of said dry ice particles and the thickness of said mass of dry ice particles is gradually reduced by sublimation to substantially zero as said perforated base moves through said stream of gas.

2. The method of claim 1 wherein said stream of gas comprises air, said dry ice particles comprise preformed pellets.

3. The method of claim 1 wherein the velocity of said stream of is reduced in the direction of movement of said perforated to maintain the reduced size dry ice particles in a fluidized bed condition.

4. The method of claim 1 wherein the speed of movement of said perforated base is controlled inversely relative to the height of dry ice particles supplied to said perforated base.

5. The method of cooling a stream of gas comprising the steps of:
    providing a continuously moving conveyor having a horizontally moving, perforated, upwardly facing flight;
    said upper flight having an input end and a discharge end;
    continuously depositing a mass of uniform size particles of dry ice on the input end of said upper flight of said conveyor; and
    directing a stream of gas upwardly through substantially the entire length of said perforated upper flight of said conveyor at a velocity selected to maintain substantially all of said dry ice particles in a fluidized bed condition, whereby all of the surface areas of said dry ice particles are contemporaneously contacted and sublimated by said stream of gas and said dry ice particles are reduced in size as said upper flight moves to said discharge position.

6. The method of claim 5 wherein said stream of gas comprises air, and said dry ice particles comprise preformed pellets.

7. The method of claim 5 wherein the velocity of said upwardly directed stream of gas is reduced in the direction of movement of said upper flight of said conveyor to maintain the reduced sized dry ice particles approaching the discharge end of said upper flight in a fluidized bed condition.

8. The method of claim 5 further comprising the step of:
    controlling the height of deposit of dry ice particles to produce substantially complete sublimation of said dry ice particles at said discharge end of said perforated upwardly facing flight.

9. The method of claim 8 further comprising the step of controlling the speed of said perforated, upwardly facing flight inversely to the height of deposit of said dry ice particles onto said conveyor.

10. Apparatus for cooling a stream of gas comprising, in combination;
    means for supplying uniformly sized dry ice particles;
    a perforated support for receiving a layer of said dry ice particles thereon;
    means for directing a stream of gas upwardly through said layer of dry ice particles; and
    means for controlling the velocity of said gas stream to maintain said dry ice particles in a fluidized bed condition.

11. The apparatus of claim 10 wherein said perforated support comprises a perforated, endless belt type, conveyor having a generally horizontal, upwardly facing flight with an input end positioned to receive said dry ice particles thereon and a discharge end; and
    said means for directing said stream of gas upwardly comprises a plurality of motor driven fans.

12. The apparatus of claim 11 wherein said plurality of fans are disposed along the path of said upper conveyor flight; and
    means for controlling the speed of said fans to provide a reduced velocity upward gas flow in the direction of movement of said upper conveyor flight to maintain substantially all of said dry ice particles in a fluidized bed condition.

13. The apparatus of claim 11 further comprising means for feeding said dry ice particles onto the input end of said upwardly facing conveyor flight at a height selected to effect the sublimation of substantially all of said dry ice particles as said particles approach the discharge end of said upwardly facing conveyor flight.

14. The method of cryogenically treating a plurality of articles comprising the steps of:
    providing an insulated wall enclosure;
    positioning a plurality of articles to be cryogenically treated within said insulated wall enclosure;
    directing a mass of uniformly sized dry ice particles onto a perforated support surface disposed within said insulated wall enclosure;
    directing a stream of gas upwardly through said mass of dry ice particles at a velocity selected to convert said dry ice particles into a fluidized bed condition, whereby substantially all surface areas of said dry ice particles are contemporaneously contacted and sublimated by said stream of gas, thereby cooling said gas; and directing said cooled stream of gas to circulate within said insulated wall enclosure in contact with said articles.

15. The method of claim 14 further comprising:

utilizing the generally horizontal upper flight of a perforated belt type conveyor as said perforated support surface, said upper flight having an input end and a discharge end; and controlling the height of deposit of dry ice particles onto the input end of the upper conveyor flight so that substantially all of said dry ice particles are sublimated prior to reaching the discharge end of said upper flight.

16. The method of claim 15 further comprising:

reducing the velocity of said upwardly directed stream of gas from the input end of said upper conveyor flight to said discharge end to maintain said dry ice particles in fluidized bed condition.

17. The method of claim 15 further comprising the step of:

controlling the speed of said perforated belt conveyor inversely relative to said height of deposit of dry ice particles onto said input end of said perforated belt conveyor.

18. Apparatus for cryogenically treating a plurality of articles comprising, in combination:

an insulated wall enclosure;

a first conveyor mounted within said enclosure for carrying articles to be cryogenically treated into and out of said enclosure;

a second conveyor in said enclosure having a generally horizontal, upwardly facing perforated surface, said surface moving continuously from an input region to a discharge region;

means for continuously depositing uniformly sized dry ice particles on said upwardly facing, perforated surface at said input region, said dry ice particles being substantially greater in size than said perforations;

means for directing an upward flow of air through said perforated upper surface with sufficient velocity to maintain said dry ice particles in a fluidized bed condition as they move from said input region to said discharge region; and means for directing the cooled air exiting from said fluidized bed of dry ice particles into contact with said articles carried on said first conveyor.

19. The apparatus of claim 18 wherein said means for directing an upward flow of air through said perforated upper surface comprises a plurality of fans spaced along the path of said perforated upper surface; and means for reducing the velocity of air flow of said fans from a maximum adjacent said input region to a minimum adjacent said discharge region to maintain said dry ice particles on said perforated upper surface in a fluidized bed condition from said input region to substantially said discharge region.

20. The apparatus of claim 18 further comprising:

means for controlling the height of deposit of dry ice particles onto said perforated upwardly facing surface at said input region so that the dry ice particles reaching said discharge region are substantially all sublimated.

21. The apparatus of claim 20 further comprising means for controlling the speed of said second conveyor inversely relative to said height of deposit of said dry ice particles.

* * * * *